United States Patent
Huang et al.

(10) Patent No.: US 9,650,266 B2
(45) Date of Patent: May 16, 2017

(54) METHOD OF TREATING SUSPENDED SOLIDS AND HEAVY METAL IONS IN SEWAGE

(71) Applicant: INSTITUTE OF NUCLEAR ENERGY RESEARCH, ATOMIC ENERGY COUNCIL, EXECUTIVE YUAN, Longtan Township (TW)

(72) Inventors: Chun-Ping Huang, Longtan Township (TW); Yi-Jing Li, Longtan Township (TW); Yen-Nung Lai, New Taipei (TW)

(73) Assignee: INSTITUTE OF NUCLEAR ENERGY RESEARCH, ATOMIC ENERGY COUNCIL, EXECUTIVE YUAN (TW)

( * ) Notice: Subject to any disclaimer, the term of this patent is extended or adjusted under 35 U.S.C. 154(b) by 252 days.

(21) Appl. No.: 14/513,741

(22) Filed: Oct. 14, 2014

(65) Prior Publication Data
US 2016/0101999 A1 Apr. 14, 2016

(51) Int. Cl.
*C02F 1/52* (2006.01)
*C02F 101/20* (2006.01)
*C02F 1/66* (2006.01)

(52) U.S. Cl.
CPC ............ *C02F 1/5245* (2013.01); *C02F 1/66* (2013.01); *C02F 2101/20* (2013.01); *C02F 2301/046* (2013.01)

(58) Field of Classification Search
USPC ........................................ 210/775
See application file for complete search history.

(56) References Cited

U.S. PATENT DOCUMENTS

| | | | | |
|---|---|---|---|---|
| 3,510,266 A | * | 5/1970 | Midler, Jr. ........... | B01D 9/0013 422/128 |
| 3,867,197 A | * | 2/1975 | Reinhardt .......... | B01D 11/0242 134/25.5 |
| 5,855,793 A | | 1/1999 | Ikeda et al. | |
| 7,736,513 B2 | | 6/2010 | Zhu et al. | |
| 2005/0016920 A1 | * | 1/2005 | Johnson ................. | C02F 3/308 210/631 |
| 2006/0278583 A1 | | 12/2006 | Tsai | |

(Continued)

FOREIGN PATENT DOCUMENTS

TW     I280951 B     5/2007

*Primary Examiner* — Chester Barry
(74) *Attorney, Agent, or Firm* — Schmeiser, Olsen & Watts, LLP

(57) ABSTRACT

A method of treating suspended solids and heavy metal ions in sewage includes (step 1) adding an iron sulfate reagent to a portion of sewage to be treated such that suspended solids therein undergo preliminary precipitation, and then separating the portion of sewage into primarily treated sewage with low turbidity and low density sludge (LDS); (step 2) filling a tank with the LDS, wherein the tank comprises a first inlet and a first outlet above the first inlet; and (step 3) conveying the other portion of sewage to be treated or the preliminarily treated sewage to the tank through the first inlet such that the sewage percolates though the LDS in the tank to fluidize the LDS and bind the suspended solid to the LDS, and in consequence, after percolating through the sludge, the treated sewage exits the tank through the outlet effluent.

11 Claims, 2 Drawing Sheets

(56) References Cited

U.S. PATENT DOCUMENTS

Figure 1:
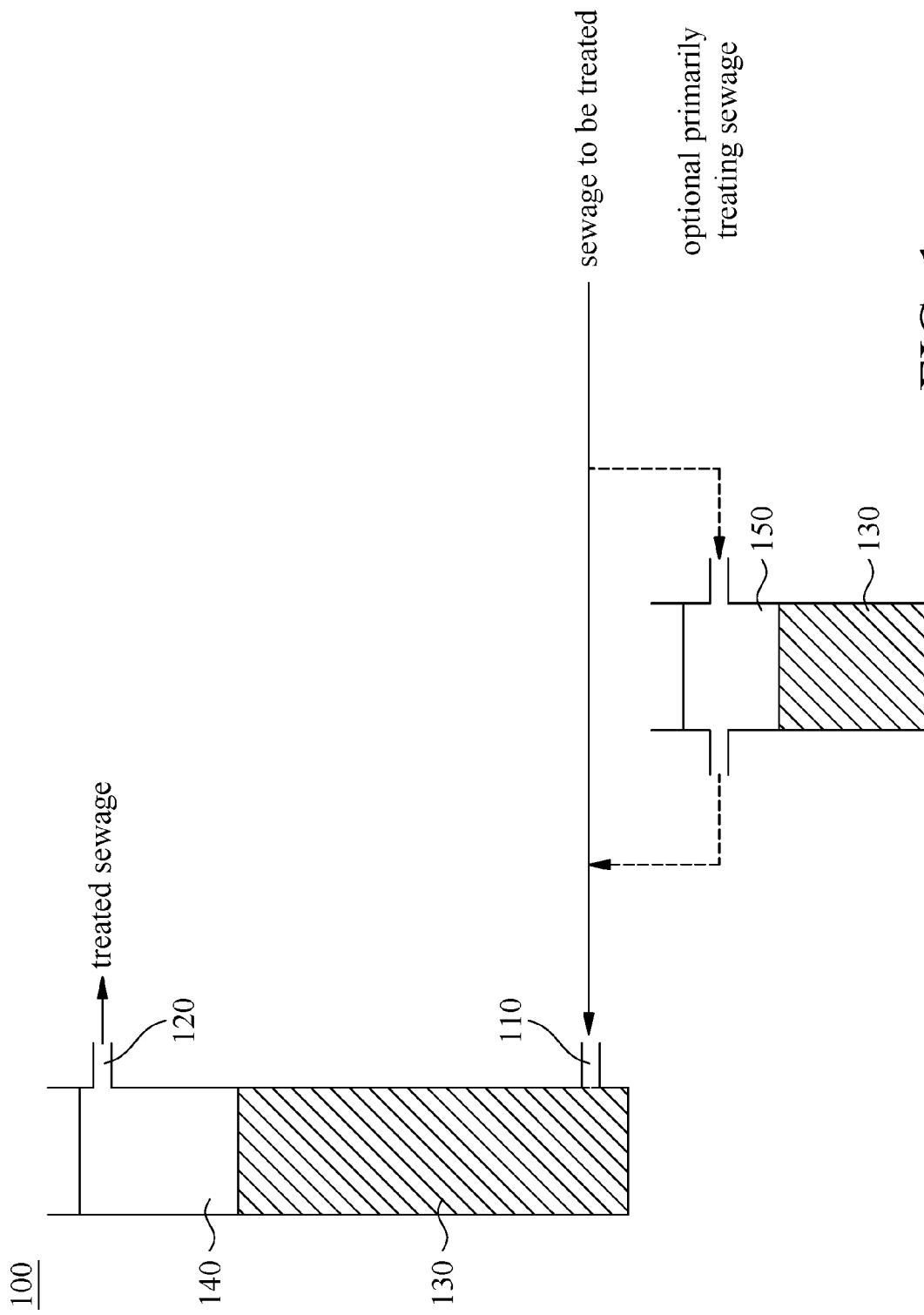

| | | | | |
|---|---|---|---|---|
| 2007/0170115 A1* | 7/2007 | Skillicorn | ............... | C02F 3/121 |
| | | | | 210/616 |
| 2008/0302723 A1* | 12/2008 | Daigger | ................ | C02F 3/1215 |
| | | | | 210/631 |
| 2013/0334144 A1* | 12/2013 | Britton | .................... | C01B 25/28 |
| | | | | 210/712 |
| 2014/0305865 A1* | 10/2014 | DiMassimo | ............ | C02F 11/18 |
| | | | | 210/607 |

* cited by examiner

METHOD OF TREATING SUSPENDED SOLIDS AND HEAVY METAL IONS IN SEWAGE

FIELD OF TECHNOLOGY

The present invention relates to sewage treatment methods, and more particularly, to a method of treating suspended solids and heavy metal ions in sewage.

BACKGROUND

The removal of suspended solids and heavy metal ions from the sewage is of vital importance to improving the water quality of the sewage. In general, unless appropriate chemical agents are added to sewage, contaminants in the sewage, such as suspended solids and heavy metal ions, will be uniformly distributed in the sewage or will be settled extremely slowly, and, as a result, it takes much time separating the contaminants from the sewage. For this reason, conventional sewage treatment methods usually involve the use of appropriate chemical agents whereby suspended solids or the other contaminants in sewage can be deposited in the form of sludge.

To speed up precipitation and enable suspended solids to bind with each other to form compact sludge, a conventional hydroxide precipitation technique works by means of chemicals, such as sodium hydroxide, lime, and magnesium hydroxide. In addition, related techniques employ related procedures and a combination of chemicals so as to be commercialized. Nonetheless, the precipitation expediting techniques still have drawbacks in common, that is, overly high water content of the sludge, difficulty in recycling, and low purification efficiency.

As mentioned before, chemicals and mixture precipitation techniques are widely used to remove suspended solids and heavy metal ions from sewage. However, one of their well known drawback is that the water content of sludge is too high (>98%). In order to reduce the water content of sludge, conventional sludge treatment techniques are based on pressure filtration and dehydration procedures. But filter cakes formed as a result of the pressure filtration and dehydration procedures have water content of 50% or more and thus incur high administration costs in the transport and disposal of the filter cakes.

In 1970, Kostenbader, Haines, and the others develop a high density sludge (HDS) process to increase the solid content of sludge to 10~30% and then perform a pressure filtration and dehydration process to reduce the water content of filter cakes to 30~50%. The HDS process works by recycling the sludge in part, mixing the recycled sludge and a slaked lime alkaline solution, and delivering the mixture to a water treatment tank such that the mixture reacts with the sludge to render the sludge compact. However, the aforesaid process has major drawbacks as follows:

it requires a reactor for use in sludge recycling and alkalinity adjustment and the reactor occupies a vast piece of land;

the treated filter cakes have high water content;

sewage treatment efficiency will be compromised, if too much sludge is recycled; and it is impossible to reduce the volume of the sludge with low solid content.

The other related conventional sewage treatment techniques are briefly described below. TW 438725 discloses a sewage treatment technique for removing hazardous ions by agglomeration and sedimentation, wherein an aluminum-containing compound and a polyacrylamide serve as agglomeration agents, and the sediment is reused as an agglomeration agent. TW I228104 discloses a sludge sewage treatment method and device characterized in that copper-containing sewage is treated and converted into precious heavy metal raw materials, and the residues are recycled and reused as an flocculating agent. TW I280951 discloses a fluidized bed process aqueous solution treatment system marked by mixing sewage, a reagent, and reflow sewage fully by a nozzle on a pipeline so as to form crystals. U.S. Pat. No. 7,736,513 discloses a solid-liquid fluidized bed sewage treatment system for use in removing carbon, nitrogen, and phosphorus concurrently, wherein biological fluidized bed technology is applied to the system, such that the sewage treatment system is equipped with two fluidized beds for removing carbon, nitrogen, and phosphorus concurrently.

In conclusion, the prior art fails to address the aforesaid drawbacks, including low cost-effectiveness of sewage treatment equipment in land use, overly high water content of filter cakes, low treatment efficiency, and failure to reduce the volume of sludge.

SUMMARY

In view of the aforesaid drawbacks of the prior art, it is an objective of the present invention to provide a method of treating suspended solids and heavy metal ions in sewage, so as to enhance the cost-effectiveness of sewage treatment equipment in land use, reduce the water content of filter cakes, improve the treatment efficiency, and reduce the volume of sludge.

In order to achieve the above and other objectives, the present invention provides a method of treating suspended solids and heavy metal ions in sewage. The method is characterized in that: a tank is filled with sludge produced as a result of purification of sewage; the sludge functions as a purification agent, such that freshly introduced sewage and chemicals undergo complex reactions on the surface of the filling sludge; and the reactions include adsorption, flocculation, crystallization, and dehydration.

According to the present invention, a method of treating suspended solids and heavy metal ions in sewage comprises the step below.

step 1: introducing an iron sulfate reagent to a portion of sewage to be treated, such that suspended solids in the sewage undergo preliminary precipitation, followed by separating the sewage preliminarily into primarily treated sewage with low turbidity and low density sludge (LDS);

step 2: filling a tank with the LDS, wherein the tank comprises a first inlet and a first outlet above the first inlet; and step 3: introducing another portion of the sewage to be treated or the primarily treated sewage to the tank through the first inlet to allow the another portion of the sewage to be treated or the primarily treated sewage to percolate through the LDS in the tank and thus fluidize the LDS, such that suspended solids in the sewage bind with the LDS bind, and the treated sewage having percolated through the LDS exits the first outlet.

As regards the method, wherein, in step 1, the iron sulfate reagent comprises iron sulfate, iron sulfate, or polymeric iron sulfate.

As regards the method, wherein step 1 further comprises introducing an alkaline earth metal hydroxide to the sewage.

As regards the method, wherein, in step 1, a ratio of the iron sulfate reagent to the alkaline earth metal hydroxide in the sewage ranges from 1:2 to 1:4.

As regards the method, wherein, in step 1, calcium hydroxide $Ca(OH)_2$ or barium hydroxide $Ba(OH)_2$ is added to the LDS.

As regards the method, wherein, in step 3, a treated sewage exiting the first outlet will eventually return to the tank through the first inlet, such that the suspended solids in the sewage bind repeatedly with the sludge in the tank, wherein the sewage is discharged from the tank as soon as the flocculated sludge can no longer be fluidized or after the treated sewage has been fully purified.

As regards the method, wherein, in step 2, an alkaline earth metal hydroxide is introduced to the sewage and then enters the inlet.

As regards the method, wherein, in step 2, the iron sulfate reagent is introduced to the sewage and then enters the inlet.

As regards the method, wherein the tank further comprises a second inlet and a second outlet above the second inlet, wherein the second inlet and the second outlet are beneath the first outlet, wherein, in step 3, the sludge exiting the second outlet will eventually return to the tank through the second inlet.

According to the present invention, a method of treating suspended solids and heavy metal ions in sewage is characterized in that: a fluidized bed technology is applied, such that suspended solids in the sewage bind with sludge in a tank continuously to therefore not only increase the density and compactness of the sludge in the tank but also decrease the suspended solids and heavy metal ions in the sewage persistently in a cycle. Finally, the compact sludge which can no longer be fluidized is taken out of the tank. The present invention is advantageous in that it reduces the volume of solid wastes, the dosage of chemicals used, enable the sludge in a reactor to convert into crystallized particles and thus facilitate solid-liquid separation, and lessen the burden imposed on any subsequent treatment unit.

BRIEF DESCRIPTION

Figure 2:
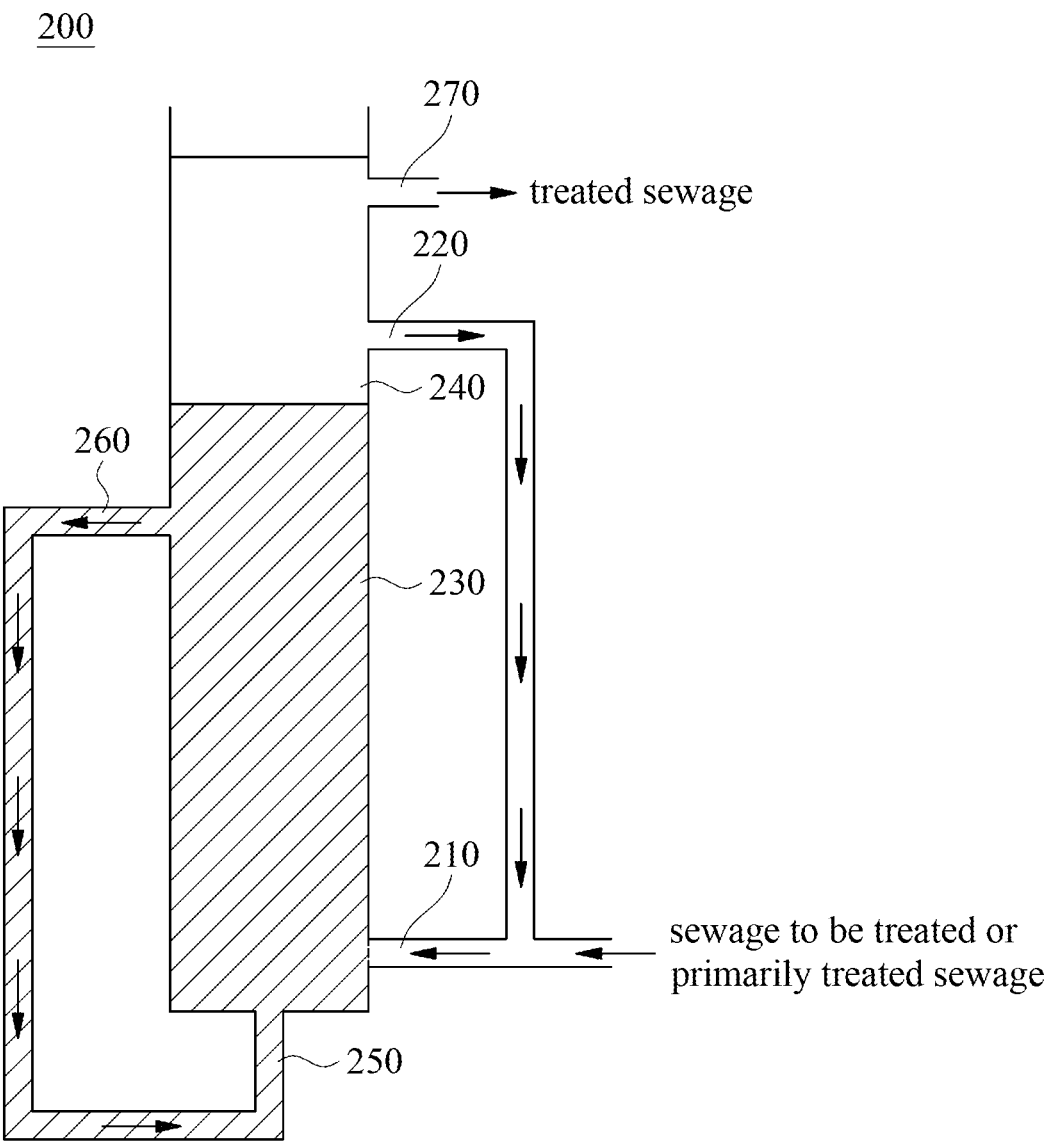

Objectives, features, and advantages of the present invention are hereunder illustrated with specific embodiments in conjunction with the accompanying drawings, in which:

FIG. 1 is a schematic view of a tank for use with a method of treating suspended solids and heavy metal ions in sewage and the operation thereof according to an embodiment of the present invention; and FIG. 2 is a schematic view of the tank for use with the method of treating suspended solids and heavy metal ions in sewage and the operation thereof according to another embodiment of the present invention.

DETAILED DESCRIPTION

Embodiment 1

In embodiment 1, a method of treating suspended solids and heavy metal ions in sewage comprises the steps as follows:

Step 1: introducing the iron sulfate reagent to a portion of sewage to be treated, such that suspended solids in the sewage undergo preliminary precipitation, followed by separating the sewage preliminarily into primarily treated sewage 150 with low turbidity and low density sludge (LDS) 130, as shown in FIG 1. In step 1, after the suspended solids in the sewage have undergone preliminary precipitation, the supernatant is regarded as the primarily treated sewage and extracted, whereas the LDS 130 precipitated is to be used in step 2.

Step 2: filling a tank with the LDS, wherein the tank comprises a first inlet and a first outlet above the first inlet. A tank 100 is involved in step 2 and step 3 of embodiment 1 and depicted in FIG. 1. The tank 100 comprises a first inlet 110 and a first outlet 120 above the first inlet 110.

Step 3: introducing the other portion of sewage to be treated or primarily treated sewage to the tank 100 through the first inlet 110 to allow the other portion of sewage to be treated or primarily treated sewage to percolate through the LDS in the tank 100 and thus fluidize the LDS, such that suspended solids and the LDS bind and then percolate through the treated sewage of the LDS, and finally exit the first outlet 120. Referring to FIG. 1, in step 3 of this embodiment, the sewage to be treated is introduced to the tank 100 through the first inlet 110, using a metering pump. The sewage thus introduced fluidizes the compact sludge in the tank 100 such that the sludge therein turns into a fluidized sludge 130. A treated sewage 140 percolates through the fluidized sludge 130 and thus forms a sewage level above the fluidized sludge 130. It is only when the sewage level rises to the height of the first outlet 120 that the treated sewage 140 which has reacted fully with the sludge begins to flow out of the first outlet 120.

During the early stage of the delivery of sewage, it is preferred that the flow rate at which the sewage is being introduced into the tank 100 is low enough to prevent the loss of the sludge in the tank. Referring to FIG. 1, preferably, the flow rate at which the sewage is being introduced into the tank 100 is kept low, such that the interface of the treated sewage 140 and the fluidized sludge 130 is below the first outlet 120. In this regard, the hydraulic retention time (HRT) ranges from 30 minutes to 5 hours, whereas the flow rate of the treated sewage 140 in the tank 100 equals 10 cm/min or so.

Preferably, after the solid particles have turned into crystallized particles, it is practicable to increase gradually the flow rate at which the sewage is introduced into the tank 100, such that HRT equals 5~15 minutes.

Preferably, the pH of the treated sewage is monitored and measured. The measured pH must be larger than 7.0 in order to ensure that iron ions, calcium ions, and barium ions in the sewage undergo reaction thoroughly. When the measured pH is less than 7.0, the process flow of the method further involves introducing an alkaline earth metal hydroxide to the sewage and then introducing the mixture to the tank through the inlet, so as to keep the pH of the treated sewage above 7.0.

Embodiment 2

Embodiment 2 is substantially the same as embodiment 1 in terms of the method of treating suspended solids and heavy metal ions in sewage, except that steps 1~3 of embodiment 1 are adjusted and intended to enhance the efficiency of sewage treatment as follows:

Step 1: introducing the iron sulfate reagent and an alkaline earth metal hydroxide to a portion of sewage to be treated, such that suspended solids in the sewage undergo preliminary precipitation, followed by separating the sewage preliminarily into primarily treated sewage with low turbidity and low density sludge (LDS). In step 1, after the suspended solids in the sewage have undergone preliminary precipitation, the supernatant is regarded as the primarily treated sewage and extracted, whereas the LDS precipitated is to be used in step 2.

As compared to embodiment 1, embodiment 2 further comprises the step of introducing an alkaline earth metal hydroxide to the sewage. The ratio of the iron sulfate reagent to the alkaline earth metal hydroxide in the sewage ranges from 1:2 to 1:4.

Step 2: adding calcium hydroxide $Ca(OH)_2$ or barium hydroxide $Ba(OH)_2$ to the LDS so as to form compact sludge, followed by filling a tank with the compact sludge, wherein the tank has a first inlet and a first outlet above the first inlet, and a second inlet and a second outlet above the second inlet, wherein the second inlet and the second outlet are beneath the first outlet. In step 2 and step 3 of embodiment 2, a tank 200 in use is shown in FIG. 2. The tank 200 has a first inlet 210, a first outlet 220 above the first inlet 210, a second inlet 250, a second outlet 260 above the second inlet 250, and a third outlet 270 above the first outlet 220. As compared to embodiment 1, the tank in embodiment 2 further comprises a second inlet 250, a second outlet 260 above the second inlet 250, and a third outlet 270 above the first outlet 220.

Step 3: mixing the other portion of the sewage to be treated or primarily treated sewage with an alkaline earth metal hydroxide and the iron sulfate reagent and then introducing the mixture to the tank 200 through the first inlet 210, such that the sewage percolates through the compact sludge in the tank 200 to fluidize the compact sludge. The fluidized sludge 230 exiting the second outlet 260 will eventually return to the tank 200 through the second inlet 250, such that the suspended solids bind with the LDS. A treated sewage 240 which has percolated the sludge is discharged from the tank 200 through the first outlet 220. Afterward, the treated sewage 240 returns to the tank 200 through the first inlet 210 so as for the suspended solids in the sewage to bind with the solid particles in the fluidized sludge 230 repeatedly. The sewage is discharged from the tank 200 as soon as the flocculated sludge can no longer be fluidized. Referring to FIG. 2, in step 3 of embodiment 2, the sewage to be treated is introduced to the tank 200 through the first inlet 210, using a metering pump. The sewage thus introduced fluidizes the compact sludge in the tank 200 such that the sludge therein turns into a fluidized sludge 230. The treated sewage percolates through the fluidized sludge 230 and thus forms a sewage level above the fluidized sludge 230. It is only when the sewage level rises to the height of the first outlet 220 that the treated sewage which has reacted fully with the sludge 230 begins to flow out of the first outlet 220.

As compared to embodiment 1, step 3 of embodiment 2 further involves introducing the fluidized sludge 230 which has exited the second outlet 260 to the tank 200 again through the second inlet 250, so as to ensure that the fluidized sludge 230 in the tank 200 can react with the sewage uniformly. In addition, in step 3 of embodiment 2, the treated sewage 240 exiting the first outlet 220 will eventually return to the tank 200 through the first inlet 210 so as for the suspended solids in the sewage to bind with the sludge in the tank 200 repeatedly. The sewage is discharged from the tank 200 through the third outlet 270 as soon as the flocculated sludge can no longer be fluidized or after the treated sewage 240 has been fully purified, so as to ensure that the suspended solids in the sewage is fully removed. In addition, in step 3 of embodiment 2, before the sewage to be treated is introduced into the tank 200, the sewage to be treated is mixed with an alkaline earth metal hydroxide and the iron sulfate reagent.

Like embodiment 1, embodiment 2 is characterized in that: during the early stage of the delivery of sewage, it is preferred that the flow rate at which the sewage is being introduced into the tank 200 is low enough to prevent the loss of the sludge in the tank 200. Referring to FIG. 2, preferably, the flow rate at which the sewage is being introduced into the tank 200 is kept low, such that the interface of the treated sewage 240 and the fluidized sludge 230 lies between the first outlet 220 and the second outlet 260 to therefore not only prevent the fluidized sludge 230 from flowing out of the tank 200 through the first outlet 220 but also allow the fluidized sludge 230 to exit the second outlet 260 and return to the tank 200 through the second inlet 250. In this regard, the HRT ranges from 30 minutes to 5 hours, whereas the flow rate of the treated sewage in the tank 200 equals 10 cm/min or so.

Preferably, a valve is disposed in the third outlet 270 and adapted to control the discharge of the treated sewage 240. In embodiment 2, a hour after the sewage has been introduced into the tank 200 through the first inlet 210, the value in the third outlet 270 is opened, but the present invention is not restrictive of the point in time at which the valve in the third outlet 270 is opened, because, in practice, the point in time at which the valve in the third outlet 270 is opened depends on the extent to which the treated sewage 240 gets purified. The purposes of the third outlet 270 are as follows: the upper portion (i.e., the relatively better purified portion) of the treated sewage 240 can be discharged from the tank 200 through the third outlet 270, whereas the lower portion (i.e., the relatively less purified portion) of the treated sewage 240 can be discharged from the tank 200 through the first outlet 220 and then returned to the tank 200 through the first inlet 210, so as to ensure that the treated sewage 240 exiting the third outlet 270 has already been fully purified.

In embodiment 2, a flocculation reagent, such as iron sulfate or polymeric iron sulfate, reacts with calcium hydroxide or barium hydroxide, so as to not only treat the sewage but also pre-treat the resultant low-solid-content sludge with the aforesaid alkaline solution to thereby produce compact sludge and then fill a tank with the sludge, wherein, preferably, the treated sewage and the fluidized sludge are returned to the tank with a metering pump.

In embodiment 1 and embodiment 2, the sewage thus introduced reacts with the solid particles disposed in the fluidized sludge and marked by large surface areas, so as to increase the density of the solid particles in the fluidized sludge. In embodiment 1 and embodiment 2, the sewage which contains suspended solids or heavy metal ions is persistently treated in a cycle with the solid particles in the fluidized sludge, so as to release suspended solids or heavy metal ions from the sewage and allow the released suspended solids or heavy metal ions to deposit on the solid particles in the fluidized sludge. Hence, the solid particles form crystallized particles, and thus their water content is reduced to 5~20%. The crystallized particles can undergo solid-liquid separation readily, without using any conventional microporous film technology. The operating principle of the sewage treatment method of the present invention is similar to that of a conventional high density sludge (HDS) process, except that the sewage treatment method of the present invention is carried out in a single tank. As compared to the conventional high density sludge (HDS) process, the sewage treatment method of the present invention does not require a reactor for use in sludge recycling and alkalinity adjustment and thus is advantageously effective in saving space.

The present invention provides a method of treating suspended solids and heavy metal ions in sewage, characterized in that: an iron sulfate reagent functions as a flocculating agent so as to mix and react fully with the sewage; then, the mixture is neutralized by an alkali, such as slaked lime, barium hydroxide, phosphate, or sodium hydroxide to form precipitates, so as to remove contaminants, such as suspended solids, uranium, and transuranyl ions, from the sewage.

In addition, sulfate ions react with calcium cations and barium cations to produce practically insoluble or absolutely insoluble sulfates, so as to prevent the electrical conductivity of the sewage from elevating excessively. Hence, the solids produced in the tank include iron hydroxides (which contain contaminants, such as heavy metal and sewage suspended solids) and sulfates.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A method of treating suspended solids and heavy metal ions in sewage, the method comprising the steps of:
   step 1: introducing an iron sulfate reagent to a portion of sewage to be treated, such that suspended solids in the sewage undergo preliminary precipitation, followed by separating the sewage preliminarily into primarily treated sewage with low turbidity and low density sludge (LDS);
   step 2: at most, only partially filling a tank with the LDS, wherein the tank comprises a first inlet and a first outlet above the first inlet; and
   step 3: introducing another portion of the sewage to be treated or the primarily treated sewage to the first inlet to allow the another portion of the sewage to be treated or the primarily treated sewage to percolate through the LDS in the tank and thus fluidize the LDS, such that suspended solids in the sewage bind with the LDS, and the treated sewage having percolated through the LDS exits the first outlet.

2. The method of claim 1, wherein, in step 3, a treated sewage exiting the first outlet is introduced to the first inlet so as to return to the tank, such that the suspended solids in the sewage bind repeatedly with the sludge in the tank, wherein the sewage is discharged from the tank as soon as the flocculated sludge can no longer be fluidized or after the treated sewage has been purified.

3. The method of claim 1, wherein, in step 1, the iron sulfate reagent comprises one of iron sulfate, iron sulfate, and polymeric iron sulfate.

4. The method of claim 3, wherein, in step 3, a treated sewage exiting the first outlet is introduced to the first inlet so as to return to the tank, such that the suspended solids in the sewage bind repeatedly with the sludge in the tank, wherein the sewage is discharged from the tank as soon as the flocculated sludge can no longer be fluidized or after the treated sewage has been purified.

5. The method of claim 3, wherein step 1 further comprises introducing an alkaline earth metal hydroxide to the sewage.

6. The method of claim 5, wherein, in step 3, a treated sewage exiting the first outlet is introduced to the first inlet so as to return to the tank, such that the suspended solids in the sewage bind repeatedly with the sludge in the tank, wherein the sewage is discharged from the tank as soon as the flocculated sludge can no longer be fluidized or after the treated sewage has been purified.

7. The method of claim 5, wherein, in step 1, a ratio of the iron sulfate reagent to the alkaline earth metal hydroxide in the sewage ranges from 1:2 to 1:4.

8. The method of claim 7, wherein, in step 3, a treated sewage exiting the first outlet is introduced to the first inlet so as to return to the tank, such that the suspended solids in the sewage bind repeatedly with the sludge in the tank, wherein the sewage is discharged from the tank as soon as the flocculated sludge can no longer be fluidized or after the treated sewage has been purified.

9. The method of claim 1, wherein, in step 1, one of calcium hydroxide $Ca(OH)_2$ and barium hydroxide $Ba(OH)_2$ is added to the LDS.

10. The method of claim 9, wherein, in step 3, a treated sewage exiting the first outlet is introduced to the first inlet so as to return to the tank, such that the suspended solids in the sewage bind repeatedly with the sludge in the tank, wherein the sewage is discharged from the tank as soon as the flocculated sludge can no longer be fluidized or after the treated sewage has been purified.

11. The method of claim 10, wherein the tank further comprises a second inlet and a second outlet above the second inlet, wherein the second inlet and the second outlet are beneath the first outlet, wherein, in step 3, the sludge exiting the second outlet is introduced to the second inlet so as to return to the tank.

* * * * *